Patented Oct. 3, 1950

2,524,383

UNITED STATES PATENT OFFICE 2,524,383

PRODUCTION OF CHLOROPRENE BY PYROLYSIS

George W. Hearne, El Cerrito, and Merrill L. Adams, Modesto, Calif.

No Drawing. Original application December 18, 1939, Serial No. 309,848. Divided and this application July 9, 1946, Serial No. 682,316

1 Claim. (Cl. 260—655)

The invention relates to a process for the production of chloroprene, and has particular reference to a novel process for producing chloroprene from certain polychlorinated saturated aliphatic hydrocarbons having four carbon atoms per molecule. This application is a division of our co-pending application Serial Number 309,848, filed December 18, 1939 and now abandoned.

As is well known, chloroprene (2-chlorbutadiene-1,3) is a highly valuable intermediary. It may be polymerized in the presence of light, heat, ozone, polymerization catalysts or other polymerizing influences to an elastic rubber-like product, or it may be converted under suitable conditions to plastic polymers resembling unvulcanized rubber. Also, chloroprene may be polymerized in the emulsified state to form a product similar to natural rubber latex. Furthermore, it is known that the polymerization may be carried out (with attendant alteration in the nature of the resulting products) in the presence of solvents, or in the presence of certain inhibitors of polymerization, or in the presence of sulfur, thiuram disulfides, and the like.

In view of the fact that the artificial rubber produced by the polymerization of chloroprene is superior, at least in some respects, to ordinary rubber, as for instance in its insolubility in hydrocarbons, such as petroleum products, there is a constant demand for chloroprene. One of the known methods of preparing chloroprene is by the addition of hydrogen chloride to monovinyl acetylene, the principal primary products thus obtained being chloroprene and 1-chlorbutadiene-2,3. This is disclosed in the Carothers and Collins patent (U. S. 1,950,431). Recently, it has been proposed to obtain chloroprene from butadiene by chlorinating it via addition to 1,2-dichlorbutene-3 and subjecting the resulting dichloride to a partial dehydrochlorination by the action of an alkali. The butadiene employed as the starting material may be produced by subjecting a normal dichlorbutane, such as 1,2-dichlorbutane or 2,3-dichlorbutane, to non-catalytic, thermal, vapor-phase dehydrochlorination at temperatures of between about 560° C. and 770° C., such a method being disclosed and claimed in U. S. Patent 2,310,523 of Groll, Hearne and Van Steitz. As pointed out in said patent, such pyrolytic dehydrochlorination, however, besides producing a considerable amount of butadiene, also yields a relatively substantial proportion of unsaturated monochlorides, such as 2-chlorobutene-2. This monochloride may be chlorinated in the liquid phase, under the influence of light and in the deliberate presence of small quantities of oxygen to yield substantial quantities of 2,3-dichlorbutene-1 and smaller percentages of a saturated trichloride, 2,2,3-trichlorbutane. This chlorination, predominantly via allylic substitution, is disclosed and claimed in U. S. Patent 2,296,614 of Hearne.

It is one of the objects of the present invention to provide an efficient and economic process for converting the aforementioned trichloride into chloroprene. A further object of the invention is to provide a process for the economic conversion of certain other trichlorbutanes into chloroprene. Still other objects will be apparent from the following description of the process.

It has now been discovered that relatively high yields of chloroprene may be obtained by subjecting 1,2,3-trichlorobutane or 2,2,3-trichlorobutane, or mixtures thereof, to a non-catalytic thermal dehydrochlorination in the absence of any basic material, the dehydrochlorination being effected in the vapor phase and at a temperature between about 450° C. and 650° C.

The pyrolysis of 1,2,3-trichlorbutane according to the present invention, although producing chloroprene, also yields some 1-chlorbutadiene-1,3.

It has been proposed to employ various processes for the removal of halogen acids from different halogen containing organic compounds, such as saturated hydrocarbons. Although some of these processes may be suitable for the dehydrochlorination of the saturated polychlorinated hydrocarbons enumerated hereinabove, such processes in some instances do not yield chloroprene while in other cases they are accompanied by so many disadvantages as to render their use uneconomical and/or cumbersome. For example, various processes involving the removal of halogen acid by means of basic agents have been proposed. These processes have the disadvantages of consuming considerable quantities of reagents and of precluding the recovery of the halogen acid. Also, in some instances the treatment with an alkali, instead of yielding the desired unsaturated monochlorinated diolefin, yields predominantly other less desirable products.

Another process employed until the present time involves the use of catalysts. This process to a certain degree overcomes the main disadvantages of the chemical dehydrochlorination by means of basic agents since it avoids the consumption of the basic reagent and permits the recovery of the hydrogen chloride. It has been invariably found, however, that in catalytic dehydrochlorination considerable polymerization to tars and decomposition to coke occurs. As a consequence the catalysts deteriorate rapidly, even at the lowest operative temperatures, and must be frequently replaced or rejuvenated.

The process according to the present invention obviates all of the above defects and disadvantages, and provides an economical method for producing high yields of chloroprene from the enumerated trichlorbutanes. This process in its most simple aspect consists of passing the anhydrous vapors of the appropriate polyhalogenated compound through a non-catalytic reaction chamber maintained at a suitable temperature, and separately recovering the chloroprene and halogen acid from the effluent vapors. The invention may be further stated to reside in subjecting the vapors of a trichlorobutane having at least one chlorine atom attached to each of the secondary carbon atoms such as 1,2,3-trichlorbutane and 2,2,3-trichlorbutane to suitable temperatures in the deliberate absence of catalysts and/or basic agents.

The process may be executed in conventional apparatus of widely varying design. One convenient method of executing the process which, in view of its simplicity is exceptionally suitable for large scale commercial production, consists in vaporizing the primary material either in a separate vaporizer or in the fore section of the reaction tube, passing the vapors continuously through an unpacked tube maintained at the desired temperature, and recovering the chloroprene and the hydrogen chloride from the effluent gases or vapors.

The dehydrochlorination reaction according to the present invention should be effected preferably at temperatures between about 450° C. and 650° C., excellent results having been realized at a reaction temperature of about 500° C. to 530° C. When the vapors of any of the above described polyhalogenated compounds are passed through the reaction tube maintained at a sufficiently high dehydrochlorinating temperature the dehydrochlorination takes place to a greater or lesser extent depending upon the severity of the prevailing conditions, i. e., the temperature and the length of time allowed for reaction. Therefore, the temperature and reaction time may be most conveniently expressed in terms of the amount of dehydrochlorination taking place. The extent to which the primary material is dehydrochlorinated (the per cent of material reacted) may be expressed as per cent "conversion." Although the present process may be operated using high per cent conversions, it has been found that it is preferable to operate under conditions which would result in relatively lower conversions per passage of the primary material through the reaction zone. This is due to the fact that under such conditions the reaction products will contain only very small amounts of vinyl acetylene as well as of products of complete decomposition of the primary material. Also, the use of the less rigorous operating conditions decreases the formation of products of polymerization. As shown in the examples, it is usually advantageous to operate under conditions which will effect a conversion of between about 40% and 60% as calculated on the amount of primary material conveyed through the reaction zone. However, in some cases it may be preferable to regulate the operating conditions to obtain greater per pass conversion rates. At any rate, the operating temperature, other conditions being constant, should be below that at which substantial decomposition to tar and/or carbon occurs.

Since only a portion of the polychlorinated material is dehydrochlorinated to chloroprene during a single passage of the primary material through the reaction zone, the unreacted material may be recycled. Such recycling may be employed in connection with either batch, semicontinuous or continuous dehydrochlorinations according to the present invention. In the case of a continuous treatment of the primary material, the polyhalide may be vaporized and conveyed in a vapor phase through an empty reaction tube maintained at the desired or optimum temperature, the rate of through-put being controlled to effect the desired conversion rate. The effluent vapors may then be cooled so as to condense the unreacted material which is then recycled back continuously or otherwise for re-evaporation and passage through the reaction zone. Obviously, additional quantities of primary material may be introduced into the evaporator either periodically or continuously. The chloroprene and the hydrogen chloride may be recovered from the vapors remaining after the condensation of the reacted material, this recovery being effected by any of the well-known means, such as chilling and stratification, etc. In this connection it must be noted that when the trichlorbutanes are dehydrochlorinated according to the present process, the reaction products will contain some dichlorbutenes, the reaction probably proceeding through the intermediate formation of such dichlorbutenes. These may be condensed together with the unreacted trichloride, and then re-vaporized and subjected to a second pyrolytic dehydrochlorination for conversion to chloroprene. In the alternative, the unreacted trichlorbutanes and the dichlorbutenes formed may be separately dehydrochlorinated according to the present process.

Although the dehydrochlorination reaction may be effected at atmospheric pressure, it is also possible to employ superatmospheric or reduced pressures. In fact, in some cases it may even be advisable to realize the reaction at reduced pressures since it reduces the yield of chloroprene polymers and of chlorine-free unsaturated polymers. The thermal, non-catalytic vapor-phase dehydrochlorination according to the present invention may also be effected in the presence of inert diluents, such as nitrogen or helium, the use of which allows the realization of the reaction under more rigorous operating conditions without the concurrent polymerization of the reaction products and/or carbonization of the primary material.

The following examples which are not to be construed as limitative are submitted to illustrate the production of chloroprene according to the present process:

*Example I*

2,2,3-trichlorbutane was vaporized and continuously conveyed at a rate of 5 cc. per minute through an empty quartz reaction tube 56 cm. long and having an internal diameter of 1.9 centimeters. The reacting tube was disposed in a 4 inch steel block heated by means of a gas fired furnace so that the temperature within the reaction tube was maintained at a temperature of about 528° C. The effluent vapors leaving the reaction tube were continuously cooled to condense the unreacted trichloride and most of the unsaturated dichlorides formed because of the relatively mild operating conditions employed. The condensate was then continuously returned to the vaporizer wherein it was commingled with fresh 2,2,3-trichlorbutane in a volumetric ratio of about 1.15:1 and, after re-vaporization, recycled at the aforementioned rate through the reaction tube. The uncondensed vapors remaining after the liquefaction of the trichloride and of the unsaturated dichlorides predominated in chloroprene and hydrogen chloride. After liquefaction, stratification and separation, it was found that the yield of chloroprene was about 41 mol. per cent. An analysis of the effluent vapors from the reaction tube indicated the following yields as based on the trichloride employed:

| | Mol. per cent |
|---|---|
| Chloroprene | 40.8 |
| 2,3-dichlorbutene-2 | 9.5 |
| 2,3-dichlorbutene-1 | 12.6 |
| 1,3-dichlorbutene-2<br>1,2-dichlorbutene-2 | 16.5 |
| Chloroprene polymer | 9.0 |
| Chlorine-free polymer | 4.1 |
| Losses | 7.5 |

Although the chloroprene yield was only about 41%, the unsaturated dichlorides formed (with the exception of the stable 2,3-dichlorbutene-2) can also be converted to chloroprene, so that the over-all yield of this desirable product may be in the neighborhood of 65 mol. per cent of the employed trichloride. Furthermore, by employing more efficient recovery means, thus eliminating or at least decreasing the losses mentioned above, it is possible to increase further the yield of chloroprene.

Although the present invention has been described in connection with the thermal, non-catalytic decomposition in open or unpacked tubes, it is also possible to employ reaction tubes which contain packing or baffles which will prevent localized or uneven dehydrohalogenation particularly when the pyrolysis is effected on a large scale and, therefore, in relatively large reaction tubes. Also, it is frequently advantageous to employ diluents which will dilute the primary material and the reaction products, thereby preventing or at least inhibiting some of the side reactions, as, for example, the polymerization of the formed chloroprene. As diluents, it is possible to use nitrogen, helium, etc., which do not react with the primary material and/or reaction product at the operating conditions.

We claim as our invention:

The method of preparing 2-chloro-butadiene-1,3 comprising subjecting vapors of 1,2,3-trichlorobutane to the action of heat at a temperature between about 450° C. and about 650° C. in the absence of a basic agent and in the absence of a catalyst.

GEORGE W. HEARNE.
MERRILL L. ADAMS.

REFERENCES CITED

The following references are of record in the file of this patent:

UNITED STATES PATENTS

| Number | Name | Date |
|---|---|---|
| 2,415,294 | Levine et al. | Feb. 4, 1947 |

OTHER REFERENCES

Interference File 79191, Hearne et al. v. Levine et al.